US009442691B2

(12) United States Patent
Gu

(10) Patent No.: US 9,442,691 B2
(45) Date of Patent: *Sep. 13, 2016

(54) GENERATING AUDIO REPRESENTATIVE OF AN ENTITY

(71) Applicant: eBay Inc., San Jose, CA (US)

(72) Inventor: Huaping Gu, Shanghai (CN)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/595,125

(22) Filed: Jan. 12, 2015

(65) Prior Publication Data

US 2015/0134091 A1 May 14, 2015

Related U.S. Application Data

(63) Continuation of application No. 13/534,901, filed on Jun. 27, 2012, now Pat. No. 8,948,897.

(51) Int. Cl.
*G06F 17/00* (2006.01)
*G06F 3/16* (2006.01)
*G06Q 30/02* (2012.01)
*G06F 17/30* (2006.01)
*H04L 29/08* (2006.01)

(52) U.S. Cl.
CPC ............ *G06F 3/165* (2013.01); *G06F 17/3074* (2013.01); *G06Q 30/02* (2013.01); *H04L 67/10* (2013.01)

(58) Field of Classification Search
CPC .... G06Q 30/20; G06F 17/3074; G06F 3/165
USPC ......................................... 700/94; 705/14.41
See application file for complete search history.

(56) References Cited

U.S. PATENT DOCUMENTS

| 7,319,988 | B2 | 1/2008 | Schull |
| 8,135,760 | B1 | 3/2012 | Todd et al. |
| 8,948,897 | B2 | 2/2015 | Gu |
| 2006/0247932 | A1* | 11/2006 | Yamamoto .................... 704/270 |
| 2008/0015953 | A1 | 1/2008 | Harper et al. |
| 2009/0061762 | A1* | 3/2009 | Patsiokas et al. ........... 455/3.02 |
| 2010/0183183 | A1 | 7/2010 | Bae et al. |

(Continued)

OTHER PUBLICATIONS

U.S. Appl. No. 13/534,901, Non Final Office Action mailed Jun. 12, 2014, 7 pgs.

(Continued)

*Primary Examiner* — Creighton Smith
(74) *Attorney, Agent, or Firm* — Schwegman, Lundberg & Woessner, P.A.

(57) ABSTRACT

Within a network-based system, an entity may be identified by an identifier of the entity. An audio generation machine may be configured to generate an audio piece that represents the entity, and the audio generation machine may generate the audio piece based on the identifier of the entity. Hence, the audio piece generated by the audio generation machine may be representative of the entity, and playback of the audio piece may identify the entity, reference the entity, highlight the entity, suggest the entity, or otherwise call the entity to mind (e.g., for one or more listeners of the audio piece). Thus, the generated audio piece may function as an audio-based avatar of the entity (e.g., a representative of the entity within a virtual world). Furthermore, the audio piece may be shared (e.g., in a social networking context or a social shopping context).

20 Claims, 8 Drawing Sheets

(56) References Cited

U.S. PATENT DOCUMENTS

| | | |
|---|---|---|
| 2011/0176668 A1* | 7/2011 | Clark et al. .............. 379/201.01 |
| 2013/0147970 A1 | 6/2013 | Herring et al. |
| 2014/0005812 A1 | 1/2014 | Gu |
| 2014/0111545 A1 | 4/2014 | Damola |
| 2014/0129452 A1 | 5/2014 | Fordyce, III et al. |

OTHER PUBLICATIONS

U.S. Appl. No. 13/534,901, Notice of Allowance mailed Sep. 22, 2014, 7 pgs.

U.S. Appl. No. 13/534,901, Response filed Sep. 11, 2014 to Non Final Office Action mailed Jun. 12, 2014, 12 pgs.

"ChordPulse—Auto accompaniment software", [Online]. Retrieved from the Internet: <URL: https://www.youtube.com/watch?feature=player_embedded&v=xTMgkO5FYuk>, (Accessed Jul. 3, 2012), 2 pgs.

"ChordPulse—Software to create your own backing tracks", Copyright © 2001-2012 Flextron Bt., [Online]. Retrieved from the Internet: <URL: http://www.chordpulse.com/info.html>, (Accessed Jul. 3, 2012), 4 pgs.

* cited by examiner

US 9,442,691 B2

GENERATING AUDIO REPRESENTATIVE OF AN ENTITY

RELATED APPLICATION

This application is a continuation of U.S. patent application Ser. No. 13/534,901, filed on Jun. 27, 2012, the benefit of priority of which is claimed hereby, and which is incorporated herein by reference in its entirety.

TECHNICAL FIELD

The subject matter disclosed herein generally relates to the processing of data. Specifically, the present disclosure addresses systems and methods to facilitate generation of audio that is representative of an entity.

BACKGROUND

A network-based system may create, store, and manage representations of various entities and various relationships between entities. Examples of entities include users (e.g., buyers, sellers, or administrators), products (e.g., items that are specimens of a product), or classifications (e.g., categories, catalogs, groups of users, or groups of products). For example, a product within a category may be available for purchase from a seller, and the seller may seek to merchandise one or more items as instances or specimens of the product. The product may take the form of a good or a service. Examples of goods include physical items (e.g., a digital camera or a car) and information items (e.g., downloaded data). Examples of services include human services (e.g., contracted work) and automated services (e.g., subscriptions). Other examples of products include authorizations (e.g., access to services, licenses, or encryption keys). In merchandising an item, the seller may use a network-based system to present an advertisement of the item to a user of the network-based system (e.g., a potential buyer of the item). Examples of network-based systems include commerce systems (e.g., shopping websites), publication systems (e.g., classified advertisement websites), listing systems (e.g., gift registries), transaction systems (e.g., payment websites), and social network systems (e.g., Facebook® or Twitter®). Examples of advertisements include a banner ad, a sidebar ad, a pop-up ad, a tool tip, a search result referencing the item, a listing for the item (e.g., within a list of items available for purchase), a review of the item, a comment on the item, or any suitable combination thereof.

BRIEF DESCRIPTION OF THE DRAWINGS

Some embodiments are illustrated by way of example and not limitation in the figures of the accompanying drawings.

DETAILED DESCRIPTION

Figure 1:
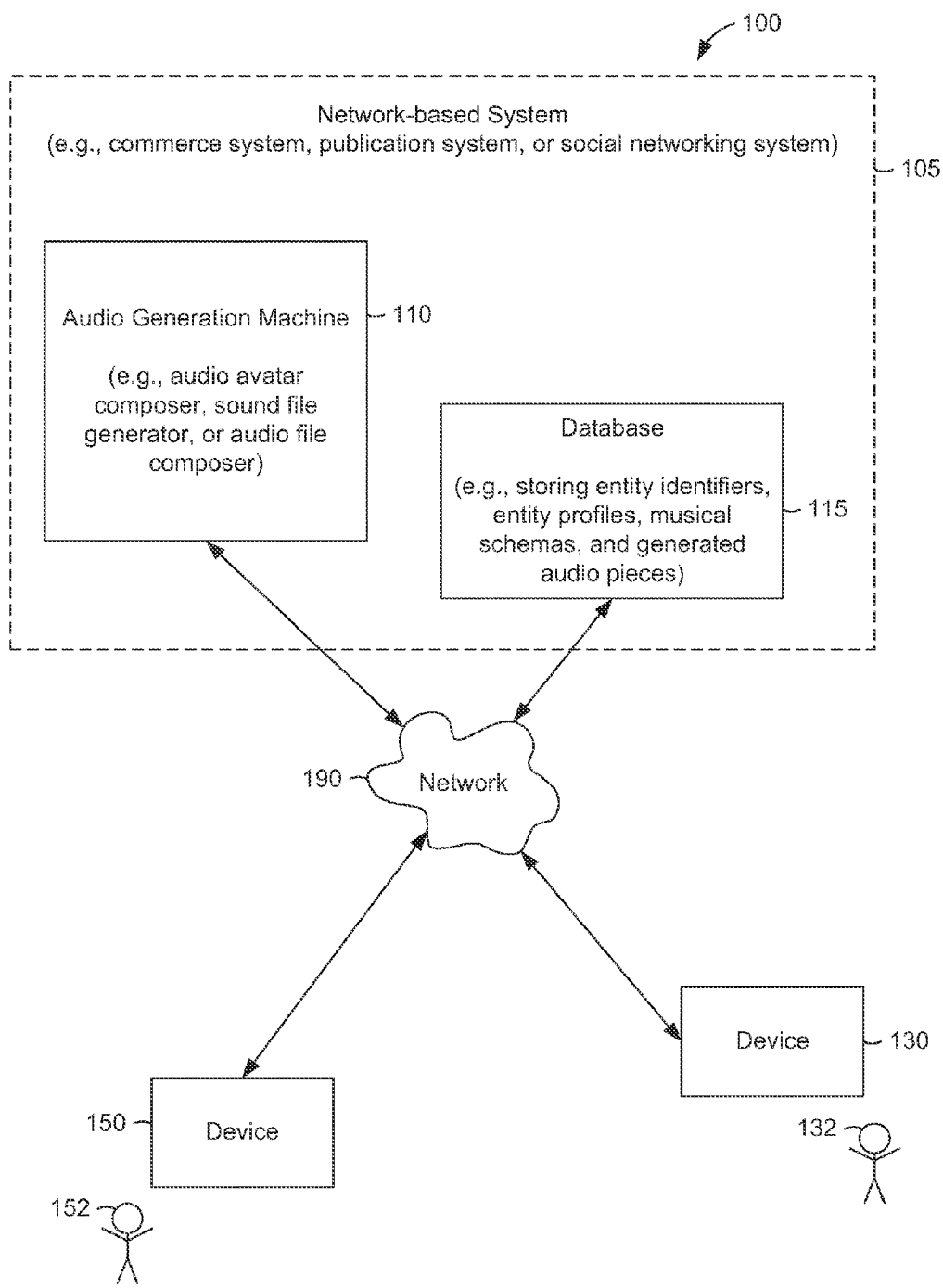
FIG. 1 is a network diagram illustrating a network environment suitable for generating audio that represents an entity, according to some example embodiments.

Example methods and systems are directed to generation of audio that is representative of an entity. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Within a network-based system, an entity may be identified by an identifier of the entity. The identifier may be assigned to the entity by the network-based system (e.g., a part number for a product), generated by the entity itself (e.g., a username for a user), or any suitable combination thereof (e.g., a user-selected username that is selected from a list of allowable usernames, or a user-submitted username that conforms to a format imposed by the network-based system).

The audio generation machine may form all or part of a network-based system within which an entity (e.g., a user, a product, or a category) corresponds to an identifier (e.g., entity identifier) of that entity, and the audio generation machine may be configured (e.g., by software) to generate an audio piece that represents the entity. The audio generation machine may generate the audio piece based on the identifier of the entity. As examples, the audio generation machine may be configured to generate music (e.g., played by a speaker in the audio generation machine or connected thereto), a sound effect (e.g., one or more sampled or synthesized sounds, tones, or noises), an audio file (e.g., in Advanced Audio Coding (AAC) format, Windows Media Audio (WMA) format, or other commercial or non-commercial audio file format), a Musical Instrument Digital Interface (MIDI) file, a multitrack audio data file (e.g., readable by a multitrack digital audio editor application), or any suitable combination thereof.

Accordingly, the audio piece generated by the audio generation machine may be representative of the entity, and playback of the audio piece may identify the entity, reference the entity, highlight the entity, suggest the entity, or otherwise call the entity to mind (e.g., for one or more listeners of the audio piece). Thus, the audio piece may function as an audio-based avatar of the entity (e.g., a representative of the entity within a virtual world). Furthermore, the audio piece may be shared (e.g., in a social networking context or a social shopping context). For example, a user of a network-based system may share an audio piece that represents the user with one or more friends of the user (e.g., as a personalized ring tone, signature, or audio business card). As another example, the user may share an audio piece that represents a product (e.g., as an indication of the product being on the user's wish list or a recent purchase of the user).

FIG. 1 is a network diagram illustrating a network environment 100 suitable for generating audio that represents an entity, according to some example embodiments. The network environment 100 includes an audio generation machine 110, a database 115, and devices 130 and 150, all communicatively coupled to each other via a network 190. In some example embodiments, the database 115 is connected to the audio generation machine 110 by a separate network or a direct wired or wireless connection. The audio generation machine 110, the database 115, and the devices 130 and 150 may each be implemented in a computer system, in whole or in part, as described below with respect to FIG. 8.

The audio generation machine 110 may be configured, labeled, or otherwise treated as an audio avatar composer (e.g., a machine configured to compose one or more audio avatars for an entity, such as a user). In various example embodiments, the audio generation machine 110 takes the form of a sound file generator (e.g., a machine configured to generate an audio file or sound file to represent an entity), an audio file composer, or any suitable combination thereof.

The database 115 may be configured to store one or more identifiers of entities (e.g., entity identifiers). Examples of identifiers for entities include a username of a user, a user number of a user, a product number of a product, a part number of a product, a stock-keeping unit (SKU) number of a product, an item number for an item (e.g., as a specimen of a product), a serial number of an item, a category number of a category, a catalog number of a catalog, a group member of a group (e.g., of users, products, items, categories, or catalogs), or any suitable combination thereof.

Furthermore, the database 115 may store one or more musical schemas (e.g., musical templates or musical profiles) that may be used by the audio generation machine 110 (e.g., according to a selection of a musical schema by a user) in generating an audio piece that represents an entity. A musical schema may define or specify one or more characteristics of a musical style, such as genre (e.g., rock or jazz), tempo (e.g., 144 beats per minute), time signature (e.g., 4/4 or 3/4), key signature (e.g., G, D sharp, or B flat), rhythm (e.g., tango or bossa nova), scale (e.g., major or minor), musical instrument voice (e.g., piano, clarinet, or timpani), or any suitable combination thereof.

As shown, the audio generation machine 110, the database 115, or both, may form all or part of a network-based system 105. As noted above, the network-based system 105 may be a commerce system (e.g., a shopping website or an auction website), a listing system (e.g., a wish list server or a gift registry system), a publication system (e.g., a blog, news website, or classified advertisement server), a transaction system (e.g., a payment processing system or a money transfer system), a social networking system (e.g., a system that provides one or more social network services, such as Facebook® or Twitter®), or a suitable combination thereof.

Also shown in FIG. 1 are users 132 and 152. One or both of the users 132 and 152 may be a human user (e.g., a human being), a machine user (e.g., a computer configured by a software program to interact with the device 130), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, or a smart phone belonging to the user 132. Likewise, the user 152 is not part of the network environment 100, but is associated with the device 150. As an example, the device 150 may be a desktop computer, a vehicle computer, a tablet computer, a navigational device, a portable media device, or a smart phone belonging to the user 152.

Any of the machines, databases, or devices shown in FIG. 1 may be implemented in a general-purpose computer modified (e.g., configured or programmed) by software to be a special-purpose computer to perform the functions described herein for that machine. For example, a computer system able to implement any one or more of the methodologies described herein is discussed below with respect to FIG. 8. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines illustrated in FIG. 1 may be combined into a single machine, and the functions described herein for any single machine may be subdivided among multiple machines.

The network 190 may be any network that enables communication between machines (e.g., the audio generation machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof.

Figure 2:
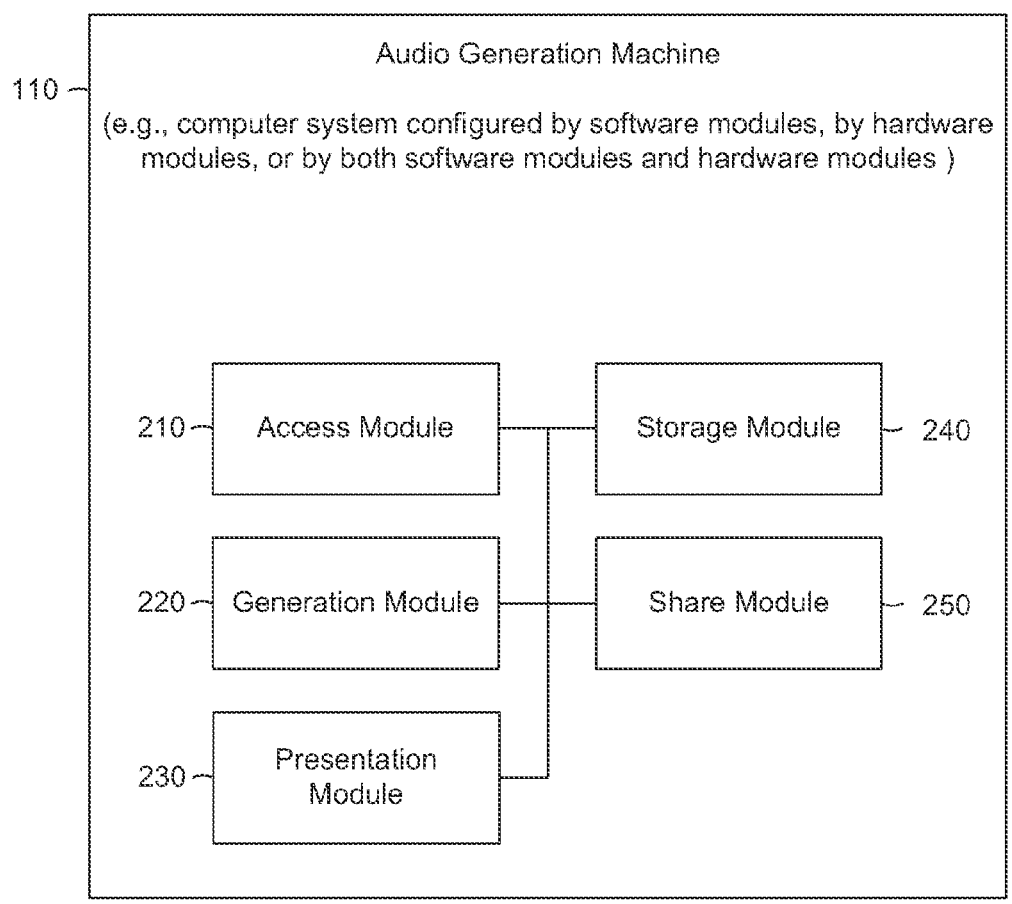
FIG. 2 is a block diagram illustrating components of an audio generation machine suitable for generating audio that represents an entity, according to some example embodiments.

FIG. 2 is a block diagram illustrating components of the audio generation machine 110, according to some example embodiments. The audio generation machine 110 includes an access module 210, a generation module 220, and a presentation module 230, all configured to communicate with each other (e.g., via a bus, shared memory, or a switch). Some example embodiments of the audio generation machine 110 also include a storage module 240, a share module 250, or both, similarly configured to communicate with other modules of the audio generation machine 110. Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Functions of the modules within the audio generation machine 110 are described below with respect to FIG. 4-7.

Figure 3:
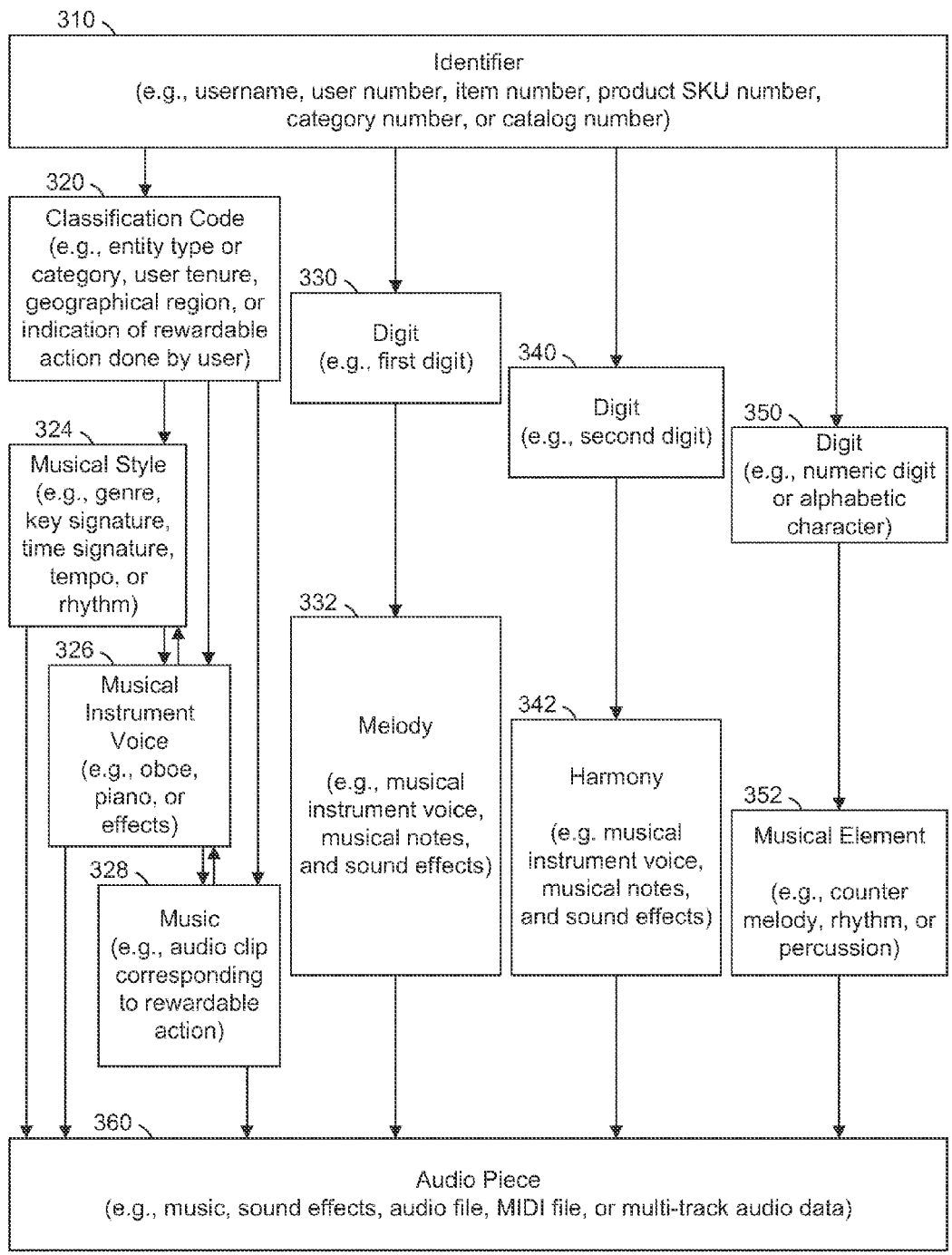
FIG. 3 is a conceptual diagram illustrating generation of an audio piece based on an identifier of an entity, according to some example embodiments.

FIG. 3 is a conceptual diagram illustrating generation of an audio piece 360 based on an identifier 310 of an entity, according to some example embodiments. The identifier 310 is illustrated as an identifier of an entity entity identifier). The identifier 310 may be or include a user name, a user number, an item number, a product SKU number, the category number, a catalog number, some other identifier of the entity, or any suitable combination thereof. According to various example embodiments, the identifier 310 identifies (e.g., uniquely) an entity (e.g., of a particular entity type or included in a particular entity category) among multiple entities (e.g., of the same entity type or included in the same entity category) that are represented within the database 115.

The audio piece 360 may be or include music, a sound effect (e.g., a sampled or synthesized sound, tone, or noise), an audio file, a MIDI file, multitrack audio data, or any suitable combination thereof. According to various example embodiments, the audio piece 360 is representative of the entity identified by the identifier 310. That is, the audio piece 360 may represent the entity that is identified by the identifier 310. Accordingly, the audio piece 360 may form all or part of an audio avatar that corresponds to the entity identified by the identifier 310.

As shown in FIG. 3, a classification code 320 may be extracted (e.g., parsed or hashed) from the identifier 310. For example, the identifier 310 may include the classification code 320, and the audio generation machine 110 may extract the classification code 320 from the identifier 310. The classification code 320 defines, indicates, or specifies a classification (e.g., entity type or entity category) to which the identifier 310 belongs, and hence, the classification code 320 may define, indicate, or specify that the entity belongs to the classification that corresponds to the classification code 320. For example, supposing the entity is the user 132, the classification code 320 may indicate a tenure of the user 132 (e.g., user tenure) with respect to the network-based system 105, with certain digits or characters in the identifier 310 signifying (e.g., encoding) how long the user 132 has used the network-based system 105 (e.g., less than one year or more than 10 years). As another example, the classification code 320 may indicate a geographical region of the entity (e.g., time zone, country, state, city, or address), with certain digits or characters in the identifier 310 signifying the geographical region. As a further example, the classification code 320 may indicate the performance of a rewardable action (e.g., task) by the user 132, with certain digits or characters in the identifier 310 signifying that the user 132 has performed the rewardable action (e.g., an action or task that renders the user 132 eligible to receive or be represented by an audio avatar that incorporates a special piece of music that corresponds to the action or task).

A musical style 324 may be determined by the audio generation machine 110 based on the classification code 320. The musical style 324 may define, indicate, or specify all or part of a musical schema (e.g., musical template or musical profile) and accordingly may define, indicate, or specify a genre, a tempo, a time signature, a key signature, a rhythm, a scale, or any suitable combination thereof. As shown, the musical style 324 may be used by the audio generation machine 110 in generating the audio piece 360. For example, the audio piece 360 may be generated based on (e.g., according to) the musical style 324.

In some example embodiments, the audio generation machine 110 determines the musical style 324 based on a musical schema (e.g., in addition to the classification code 320), and such a musical schema may be determined by the audio generation machine 110, determined by the user 132 (e.g., via selection from a list of available musical schemas), or any combination thereof. For example, the audio generation machine 110 may offer a selection of available musical schemas to the user 132 (e.g., via the device 130), and the user 132 may submit a selection of a particular musical schema to the audio generation machine 110, which may determine the musical style 324 based on the selected musical schema. In certain example embodiments, the audio generation machine 110 may determine the musical schema based on the classification code 320. For example, the classification code 320 may indicate a type or category of the entity, and the audio generation machine 110 may determine the musical schema based on the entity's type or category (e.g., a smooth and soil musical schema for products classified as baby accessories, or a fast and aggressive musical schema for products classified as electronics).

Moreover, a musical instrument voice 326 may be determined by the audio generation machine 110 based on the classification code 320, the musical style 324, or both. The musical instrument voice 326 may be any synthesized or sampled sound, tone, noise, or any suitable combination thereof (e.g., an orchestra sound produced by layering together sounds of various orchestra instruments). In some example embodiments, a musical style 324 is at least partially determined based on the musical instrument voice 326. For example, the musical instrument voice 326 may be determined to be an oboe (e.g., a synthesized or sampled oboe sound), a piano (e.g., a synthesized or sampled piano sound), a sound effect (e.g., a synthesized or sampled thunderclap or bird chirp), or any other synthesized or sampled sound, tone, or noise. As shown, the musical instrument voice 326 may be used by the audio generation machine 110 in generating the audio piece 360. For example, the audio piece 360 may include one or more sounds, tones, or noises voiced (e.g., played) by the musical instrument voice 326.

Furthermore, music 328 to be included in the audio piece 360 may be determined by the audio generation machine 110 based on the classification code 320, the musical style 324, the musical instrument voice 326, or any suitable combination thereof. In some example embodiments, the musical instrument voice 326 is at least partially determined based on the music 328 to be included in the audio piece 360. For example, the music 328 may be or include an audio clip corresponding to a rewardable action which may be an action or task that renders a user (e.g., user 132) eligible to have the music 328 (e.g., a special fanfare or theme song) incorporated into an audio avatar generated for that user. As shown, the music 328 may be used by the audio generation machine 110 in generating the audio piece 360. For example, the audio piece 360 may incorporate the music 328 (e.g., by inclusion or by reference).

As shown in FIG. 3, digits 330, 340, and 350 may be extracted from the identifier 310. For example, the audio generation machine 110 may extract the digit 330 as a first digit (e.g., a hundreds digit), extract the digit 340 as a second digit (e.g., the tens digit), and extract the digit 350 as a third digit (e.g., a ones digit). Any one or more of the digits 330, 340, or 350 may be a numeric digit or an alphabetic character. As an example, supposing the identifier 310 is "0987654321," the "3" may be extracted as the digit 330; the "2" may be extracted as the digit 340; and the "1" may be extracted as the digit 350.

As shown, a melody 332 may be determined by the audio generation machine 110, and the melody 332 may be determined based on the digit 330 (e.g., the first digit). Determination of the melody 332 may include determination of a musical instrument voice (e.g., similar to the musical instrument voice 326) for the melody 332, determination of one or more musical notes of the melody 332, determination of one or more sound effects to be included in the melody 332, or any suitable combination thereof. As shown, the melody 332 may be used by the audio generation machine 110 in generating the audio piece 360. For example, the audio piece 360 may incorporate the melody 332 (e.g., by inclusion or by reference).

Likewise, a harmony 342 may be determined by the audio generation machine 110, and the harmony 342 may be determined based on the digit 340 (e.g., the second digit). Determination of the harmony 342 may include determination of a musical instrument voice (e.g., similar to the musical instrument voice 326) for the harmony 342, determination of one or more musical notes of the harmony 342, determination of one or more sound effects to be included in the harmony 342, or any suitable combination thereof. As shown, the harmony 342 may be used by the audio generation machine 110 in generating the audio piece 360. For example, the audio piece 360 may incorporate the harmony 342 (e.g., by inclusion or by reference).

In a similar manner, a musical element 352 may be determined by the audio generation machine 110, and the musical element 352 may be determined based on the digit 350 (e.g., the third digit). Examples of the musical element 352 include a counter melody, a rhythm, percussion (e.g., a drumbeat or a repeating loop of one or more percussion instrument voices), or any suitable combination thereof. As shown, the musical elements 352 may be used by the audio generation machine 110 in generating the audio piece 360. For example, the audio piece 360 may incorporate the musical element 352 (e.g., by inclusion or by reference).

Accordingly, the audio piece 360 may be generated by the audio generation machine 110 based on (e.g., with contributions from) the classification code 320, the digits 330, 340, and 350, or any suitable combination thereof. According to various example embodiments, one or more digits (e.g., digit 330) is a basis for generation of the melody 332; one or more digits (e.g., digit 340) is a basis for generation of the harmony 342; one or more digits (e.g., digit 350) is a basis for generation of the musical element 352; and the classification code 320 is a basis for generation of the musical style 324, the musical instrument voice 326, the music 328 to be included in the audio piece 360, or any suitable combination thereof. In some example embodiments, the classification code 320 takes the form of one or more digits similar to the digits 330, 340, and 350.

Figure 4:
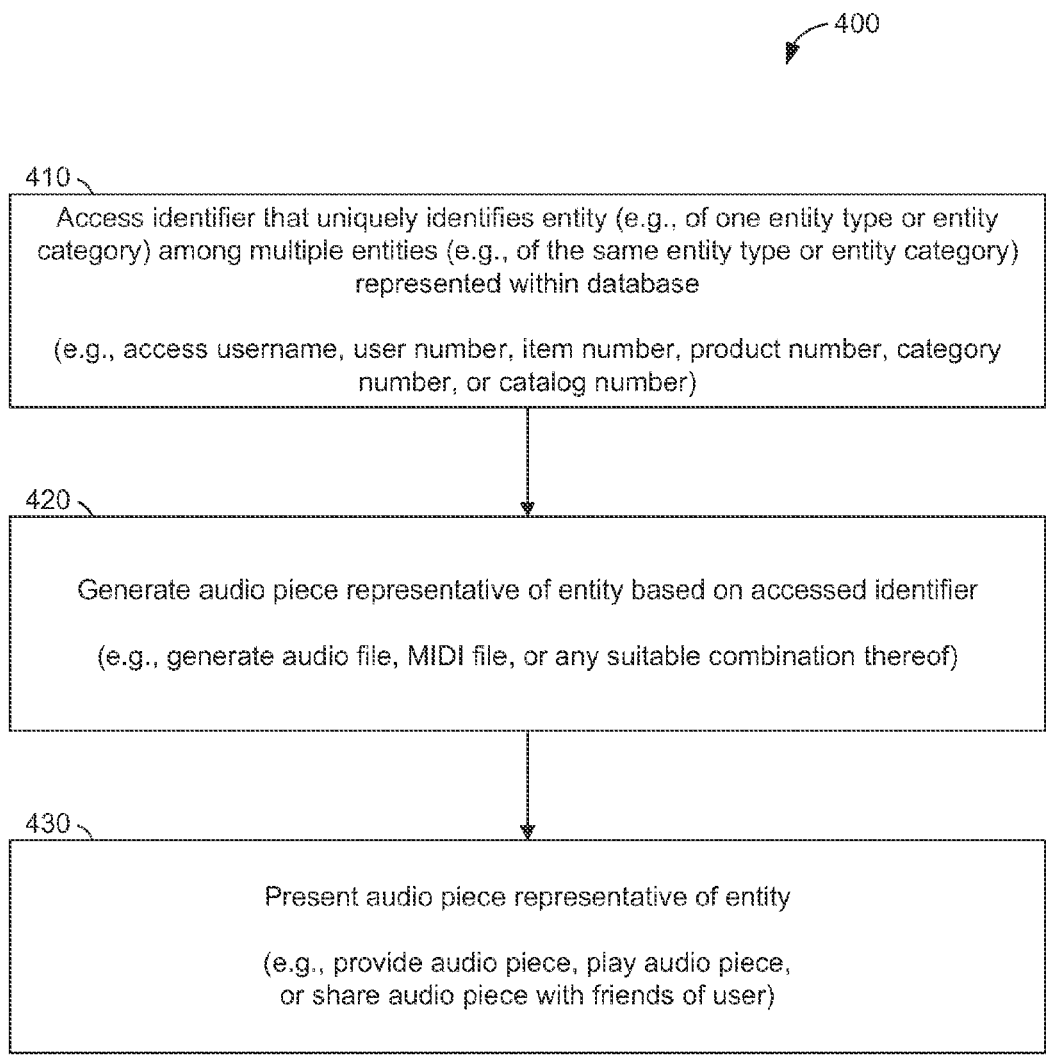
FIG. 4-7 are flowcharts illustrating operations of the audio generation machine in performing a method of generating audio that represents an entity, according to some example embodiments.

FIG. 4-7 are flowcharts illustrating operations of the audio generation machine 110 in performing a method 400 of generating audio that represents an entity, according to some example embodiments. Operations in the method 400 may be performed by the audio generation machine 110, using modules described above with respect to FIG. 2. As shown in FIG. 4, the method 400 includes operations 410, 420, and 430.

In operation 410, the access module 210 accesses the identifier 310 (e.g., from the database 115). As noted above, the identifier 310 may identify an entity among multiple entities that are represented within the database 115. For example, the identifier 310 may uniquely identify an entity of an entity type among multiple entities of that same entity type represented in the database 115. As another example, the identifier 310 may uniquely identify an entity within an entity classification (e.g., entity category) among multiple entities that are included in the same entity classification, with respect to the database 115. In some example embodiments, the identifier 310 identifies the user 132 (e.g., as a user of the network-based system 105). Performance of operation 410 may involve the access module 210 accessing the identifier 310 by accessing user name, user number, item number, product number, category number, catalog number, or any suitable combination thereof.

In operation 420, the generation module 220 generates the audio piece 360. As noted above, the audio piece 360 may be representative of the entity identified by the identifier 310 (e.g., an audio-based avatar that corresponds to the entity identified by the identifier 310). Generation of the audio piece 360 may be performed based on the identifier 310 accessed in operation 410. For example, as noted above with respect to FIG. 3, generation of the audio piece 360 may be performed based on the classification code 320, the digit 330, the digit 340, the digit 350, or any suitable combination thereof, which may be extracted by the audio generation machine 110 from the identifier 310. In some example embodiments, the generation module 220 extracts the classification code 320, the digit 330, the digit 340, the digit 350, or any suitable combination thereof, and generates the audio piece 360 based thereon. Such extraction may be performed by parsing the identifier 310, hashing the identifier 310, or both.

According to certain example embodiments, the generation module 220 determines a musical schema, a musical style 324, or both, for the audio piece 360 to be generated. As noted above with respect to FIG. 3, this may be accomplished by determining a musical schema based on the classification code 320 extracted from the identifier 310. The musical schema may be determined based on the classification code 320, based on a selection submitted by the user (e.g., user 132), or any suitable combination thereof. Hence, the musical style 324 may be determined by the generation module 220 based on the determined musical schema.

According to some example embodiments, the generation module 220, after generation of the audio piece 360, may initiate storage of the audio piece 360 in the database 115 (e.g., for presentation at a later time). For example, the generation module 220 may signal or command the storage module 240 to store the audio piece 360 in the database 115, and the storage module 240 may perform the storage of the audio piece 360 in the database 115 (e.g., for subsequent access and presentation by the presentation module 230).

In operation 430, the presentation module 230 presents the generated audio piece 360 that represents the entity identified by the identifier 310. For example, the presentation module 230 may present the audio piece 360 as a representation of the entity identified by the identifier 310 (e.g., accessed in operation 410). Presentation of the audio piece 360 may include accessing the audio piece 360 (e.g., from the database 115), providing (e.g., communicating) the audio piece 360, playing the audio piece 360, sharing the audio piece 360 (e.g., with the user 152, who may be a friend of the user 132), or any suitable combination thereof. According to various example embodiments, the presentation module 230 may present the audio piece 360 by communicating all or part of the audio piece 360 to the device 130 (e.g., for presentation to the user 132), to the device 150 (e.g., for presentation to the user 152), or both.

Figure 5:
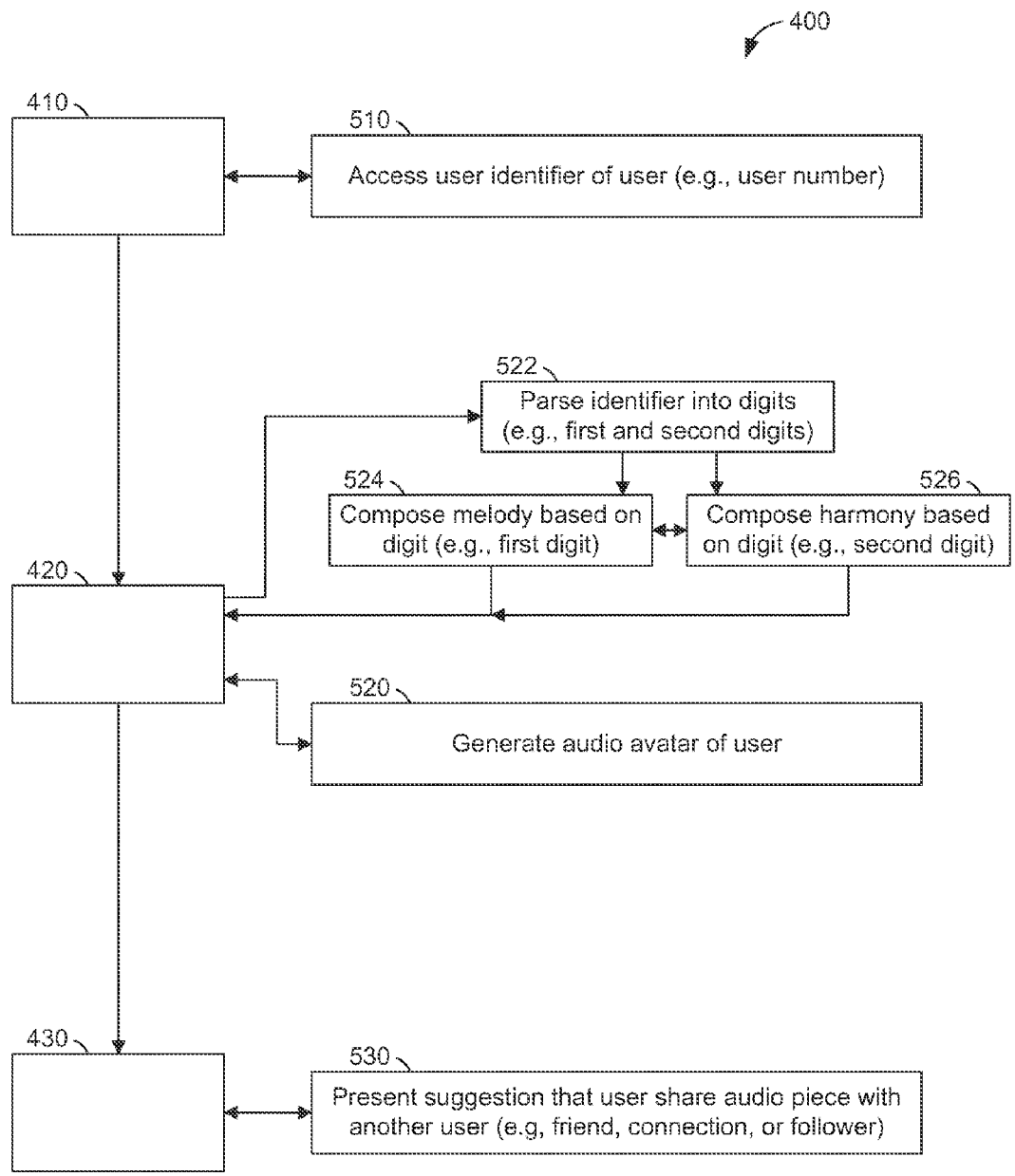

As shown in FIG. 5, the method 400 may include one or more of operations 510, 520, 522, 524, 526, and 530. Operation 510 may be performed as part (e.g., a precursor task, a subroutine, or a portion) of operation 410, in which the access module 210 accesses the identifier 310. In operation 510, the access module 210 accesses a user identifier that identifies the user 132 (e.g., a user number or username of the user 132). For example, the user identifier may form all or part of the identifier 310. As noted above, the user identifier may be assigned to the user 132 by the network-based system 105, generated by the user 132, or any suitable combination thereof.

One or more of operations 522, 524, 526, and 520 may be performed as part of operation 420, in which the generation module 220 generates the audio piece 360 based on the identifier 310. In operation 522, the generation module 220 parses the identifier 310 into one or more digits (e.g., digits 330, 340, and 350) or groups of digits (e.g., a group that contains the digits 330 and 340, as well as another group that contains the digit 350). Operation 522 may be performed as all or part of extracting the one or more digits from the identifier 310. As noted above, the digit 330 may be deemed a first digit, and the digit 340 may be deemed a second digit.

In operation 524, the generation module 220 composes the melody 332 based on a digit (e.g., digit 330) parsed from the identifier 310. For example, the melody 332 may be composed by the generation module 220 based on the digit 330 (e.g., the first digit), which may be parsed from the identifier 310 in operation 522. In alternative example embodiments, a different digit parsed from the identifier 310 is used as a basis for composing the melody 332.

In operation 526, the generation module 220 composes the harmony 342 based on a digit (e.g., 340) parsed from the identifier 310. For example, the harmony 342 may be composed by the generation module 220 based on the digit 340 (e.g., the second digit), which may be parsed from the identifier 310 in operation 522. In alternative example embodiments, a different digit parsed from the identifier 310 is used as a basis for composing the harmony 342.

In operation 520, the generation module 220 generates an audio avatar of the user 132. For example, the generation module 220 may generate the audio piece 360 by generating the audio avatar of the user 132. That is, the audio avatar of the user 132 may be the same as the audio piece 360. As another example, the generation module 220 may generate the audio piece 360 as including the audio avatar of the user 132. In other words, the audio avatar of the user 132 may be included in the audio piece 360 (e.g., along with additional music, sounds, tones, or noises).

Operation 530 may be performed as part of operation 430, in which the presentation module 230 presents the audio piece 360. In operation 530, the presentation module 230 presents a suggestion (e.g., within a message, an alert, or a notifier) that the user 132 share the audio piece 360 with the user 152 (e.g., a further user of the network-based system 105). For example, the presentation module 230 may communicate a pop-up message to the user 132 (e.g., via the device 130) that the audio piece 360 has been generated and may be shared with friends of the user 132, where the user 152 is included among the friends of the user 132 (e.g., as represented within a model of a social network maintained by the network-based system 105 and stored within the database 115).

Figure 6:
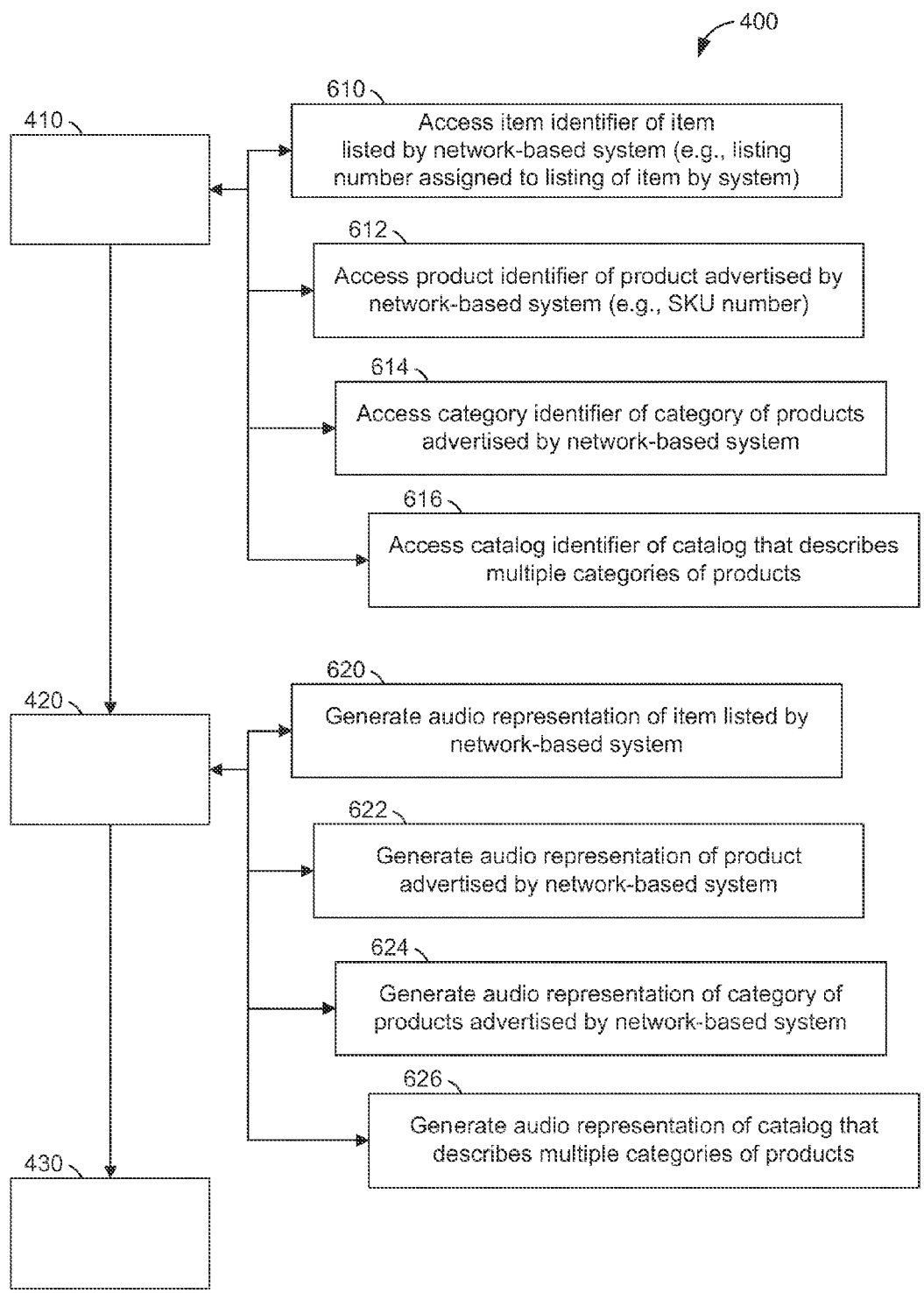

As shown in FIG. 6, the method 400 may include one or more of operations 610, 612, 614, 616, 620, 622, 624, and 626. One or more of operations 610, 612, 614, and 616 may be performed as part of operation 410, in which the access module 210 accesses the identifier 310. One or more of operations 620, 622, 624, and 626 may be performed as part of operation 420, in which the generation module 220 generates the audio piece 360.

In some example embodiments, the identifier 310 is or includes an identifier of an item listed by the network-based system 105. Accordingly, the identifier 310 may be or include an item identifier (e.g., a listing number assigned to a listing of the item by the network-based system 105) that identifies the item (e.g., uniquely) within the database 115. In operation 610, the access module 210 accesses the item identifier that identifies the item listed by the network-based system 105. Correspondingly, in operation 620, the generation module 220 generates an audio representation of the item listed by the network-based system 105. The audio representation thus generated may form all or part of the audio piece 360 generated in operation 420.

In certain example embodiments, the identifier 310 is or includes an identifier of a product advertised by the network-based system 105. Accordingly, the identifier 310 may be or include a product identifier (e.g., a SKU number that corresponds to the product) that identifies the product (e.g., uniquely) within the database 115. In operation 612, the access module 210 accesses the product identifier that identifies the product advertised by the network-based system 105. Correspondingly, in operation 622, the generation module 220 generates an audio representation of the product advertised by the network-based system 105. The audio representation thus generated may form all or part of the audio piece 360 generated in operation 420.

In various example embodiments, the identifier 310 is or includes an identifier of a category of products that are advertised by the network-based system 105. Accordingly, the identifier 310 may be or include a category identifier (e.g., a category label or a category number) that identifies the category (e.g., uniquely) within the database 115. In operation 614, the access module 210 accesses the category identifier that identifies the category of products advertised by the network-based system 105. Correspondingly, in operation 624, the generation module 220 generates an audio representation of the category of products. The audio representation thus generated may form all or part of the audio piece 360 generated in operation 420.

In some example embodiments, the identifier 310 is or includes an identifier of a catalog that describes multiple categories of products (e.g., listed or advertised by the network-based system 105). Accordingly, the identifier 310 may be or include a catalog identifier (e.g., a catalogue label or a catalog number) that identifies the catalog (e.g., uniquely) within the database 115. In operation 616, the access module 210 accesses the catalogue identifier that identifies the catalog that describes the multiple categories of products. Correspondingly, in operation 626, the generation module 220 generates an audio representation of the catalog that describes the multiple categories of products. The audio representation thus generated may form all or part of the audio piece 360 generated in operation 420.

Figure 7:
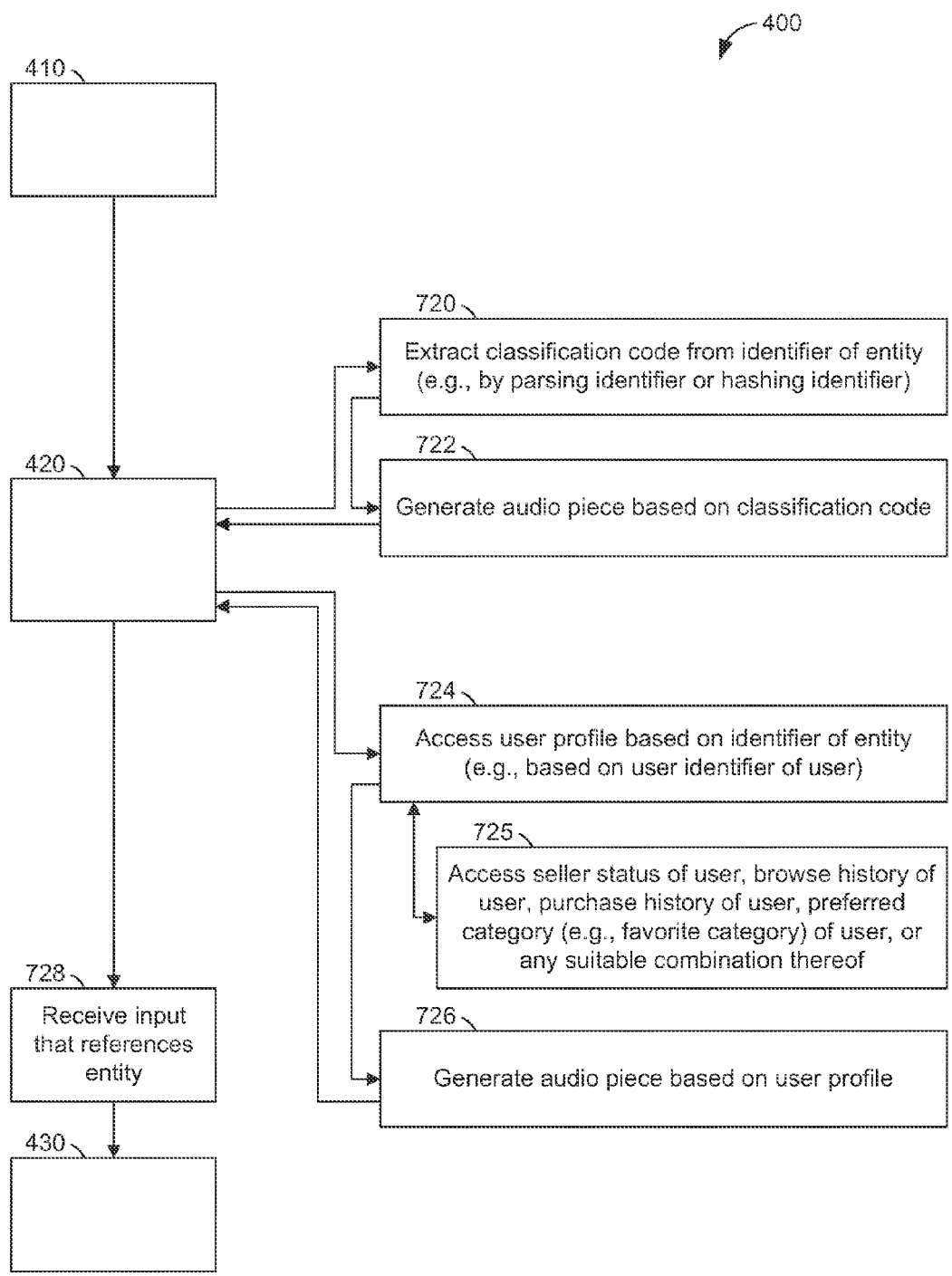

As shown in FIG. 7, the method 400 may include one or more of operations 720, 722, 724, 725, 726, and 728. Operation 720 and 722 may be performed as part of operation 420, in which the generation module 220 generates the audio piece 360. In operation 720, the generation module 220 extracts the classification code 320 from the identifier 310. For example, the generation module 220 may parse the identifier 310 to extract the classification code 320. As another example, the generation module 220 may hash the identifier 310 to extract the classification code 320. In some example embodiments, both parsing and hashing are performed in operation 720.

In operation 722, the generation module 220 generates the audio piece 360 based on the classification code 320 extracted in operation 720. As noted above with respect to FIG. 3, the generation of the audio piece 360 may include or incorporate a musical style 324, the musical instrument voice 326, the music 328, or any suitable combination thereof, any one or more of which may be generated based on the classification code 320.

According to various example embodiments, the classification code 320 indicates that the entity identified by the identifier 310 corresponds to a geographical region (e.g., a time zone, a country, a state, a city, or an address). In some of these example embodiments, performance of operation 722 includes selecting the musical instrument voice 326 based on the geographical region that corresponds to the entity identified by the identifier 310 (e.g., as indicated by the classification code 320). In certain example embodiments, performance of operation 722 includes selecting the musical style 324 based on the geographical region that corresponds to the entity identified by the identifier 310 (e.g., as indicated by the classification code 320).

According to some example embodiments, the classification code 320 indicates that the entity is a member of (e.g., belongs to) a category that includes at least some of the multiple entities represented in the database 115. If the entity is a user (e.g., the user 132), a category may be a category of users (e.g., new users or infrequent users). If the entity is a product or item, the category may be a category of products or items (e.g., new products, products on sale, or popular products). Hence, performance of operation 722 may include selecting the musical style 324 based on the category of which the entity is a member (e.g., the category of the user 132 or the category of the product or item).

According to certain example embodiments, the entity is the user 132, and the identifier 310 is a user identifier of the user 132. In such example embodiments, the classification code 320 may indicate that the user 132 has a tenure with respect to the network-based system 105, and the classification code 320 may indicate that the tenure of the user 132 transgresses a threshold value (e.g., a minimum tenure or a maximum tenure, expressed in months or years). Hence, performance of operation 722 may include generating the audio piece 360 based on the tenure of the user 132. In particular, the generating of the audio piece 360 may be based on the tenure of the user 132 transgressing the threshold value.

In some example embodiments where the entity is the user 132, the classification code 320 indicates that the user 132 performed a rewardable action (e.g., an action or task rewardable by inclusion of the music 328 in the audio piece 360 to be generated as an audio avatar for the user 132). Hence, performance of operation 722 may include generating the audio piece 360 based on the classification code 320 indicating that the user 132 performed the rewardable action. In particular, the generating of the audio piece 360 may incorporate the music 328 into the audio piece 360, where the music 328 corresponds to the rewardable action.

In various example embodiments where the entity is the user 132, operations 724 and 726 may be performed as part of operation 420, in which the generation module 220 generates the audio piece 360. In operation 724, the generation module 220 accesses a user profile of the user 132 based on the identifier 310. For example, the user profile may be accessed from the database 115, and the user profile may be accessed based on the identifier 310 of the user 132.

Operation 725 may be performed as part of operation 724, in which the generation module 220 accesses the user profile based on the identifier 310. The user profile may include various information about the user 132, and some or all of this various information may be accessed by the generation module 220 in performing operation 725. Examples of such information about the user 132 include a seller status of the user 132 (e.g., active, highly rated, banned, poorly rated, or new), a browse history of the user 132 (e.g., pages viewed or products viewed in the past month or past year), a purchase history of the user 132 (e.g., products or items purchased within the past month or past year), a preferred category of the user 132 (e.g., a category from which the user 132 has purchased the most items or products within the past month or past year), or any suitable combination thereof.

Accordingly, in example embodiments where the entity is the user 132, the generation module 220 may perform operation 726 by using the user profile in generating the audio piece 360. For example, operation 726 may be performed by generating the audio piece 360 based on some or all of the various information included in the user profile.

In operation 728, the share module 250 receives an input that references the entity identified by the identifier 310 and represented by the audio piece 360. For example, supposing the entity is the user 132, the share module 250 may monitor inputs received by the network-based system 105 for references to the user 132, and the share module 250 may receive such an input that references the user 132 (e.g., by username or by user number). As another example, supposing the entity is a product (e.g., "Brand X digital camera, model 10"), the share module 250 may monitor inputs received by the network-based system 105 for references to the product, and the share module may receive such an input that references the product. Accordingly, operation 430 may be performed by the presentation module 230 in response to the input received in operation 728. In various example embodiments, the share module 250 performs additional functions to support sharing of audio avatars (e.g., audio piece 360) between or among multiple users (e.g., users 132 and 152). For example, the share module 250 may trigger the performance of operation 530, in which the presentation module 230 presents a suggestion that the user 132 share the audio piece 360 with another user (e.g., user 152), and this triggering may be based on the input received in operation 728. The share module 250 may monitor the network-based system 105 for information that indicates an event that is related to the entity identified by identifier 310 and receive an indication of the social event as the input received in operation 728. Examples of the information that indicates the event include commerce information (e.g., product searches, views of product web pages, or clicks on advertisements), transaction information (e.g., purchases, sales, exchanges, or refunds), social networking information (e.g., new friends, connections, or followers), or any suitable combination thereof.

Hence, the combination of operations 728 and 430 may result in the audio generation machine 110 presenting the audio piece 360 based on (e.g., triggered by) input that pertains to the entity, and the presentation of the audio piece 360 may thereby identify the entity, reference the entity, highlight the entity, suggest the entity, or otherwise call the entity to mind. In situations where the entity is the user 132, the audio piece 360 may function as an audio avatar of the user 132 and may be presented (e.g., played) whenever the user 132 is mentioned (e.g., in a welcome message displayed to the user 132, in a message from the user 132 to the user 152, or in a web page that describes the user 132). In situations where the entity is a product, the audio piece 360 may function as an audio avatar of the product and may be presented whenever the product is mentioned (e.g., in a web page that describes the product, in a message regarding the product, or in an advertisement for the product).

According to various example embodiments, one or more of the methodologies described herein may facilitate generation of an audio representation of an entity. Moreover, one or more of the methodologies described herein may facilitate presentation of an audio avatar that represents an entity. Hence, one or more the methodologies described herein may facilitate composition of music or sounds that correspond to an entity and may enhance one or more communications pertinent to the entity by the addition of supplemental music or sounds.

When these effects are considered in aggregate, one or more of the methodologies described herein may obviate a need for certain efforts or resources that otherwise would be involved in generating, presenting, or communicating audio that is representative of an entity. Efforts expended by a user (e.g., user 132) in generating and sharing an audio avatar that corresponds to the user may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 8:
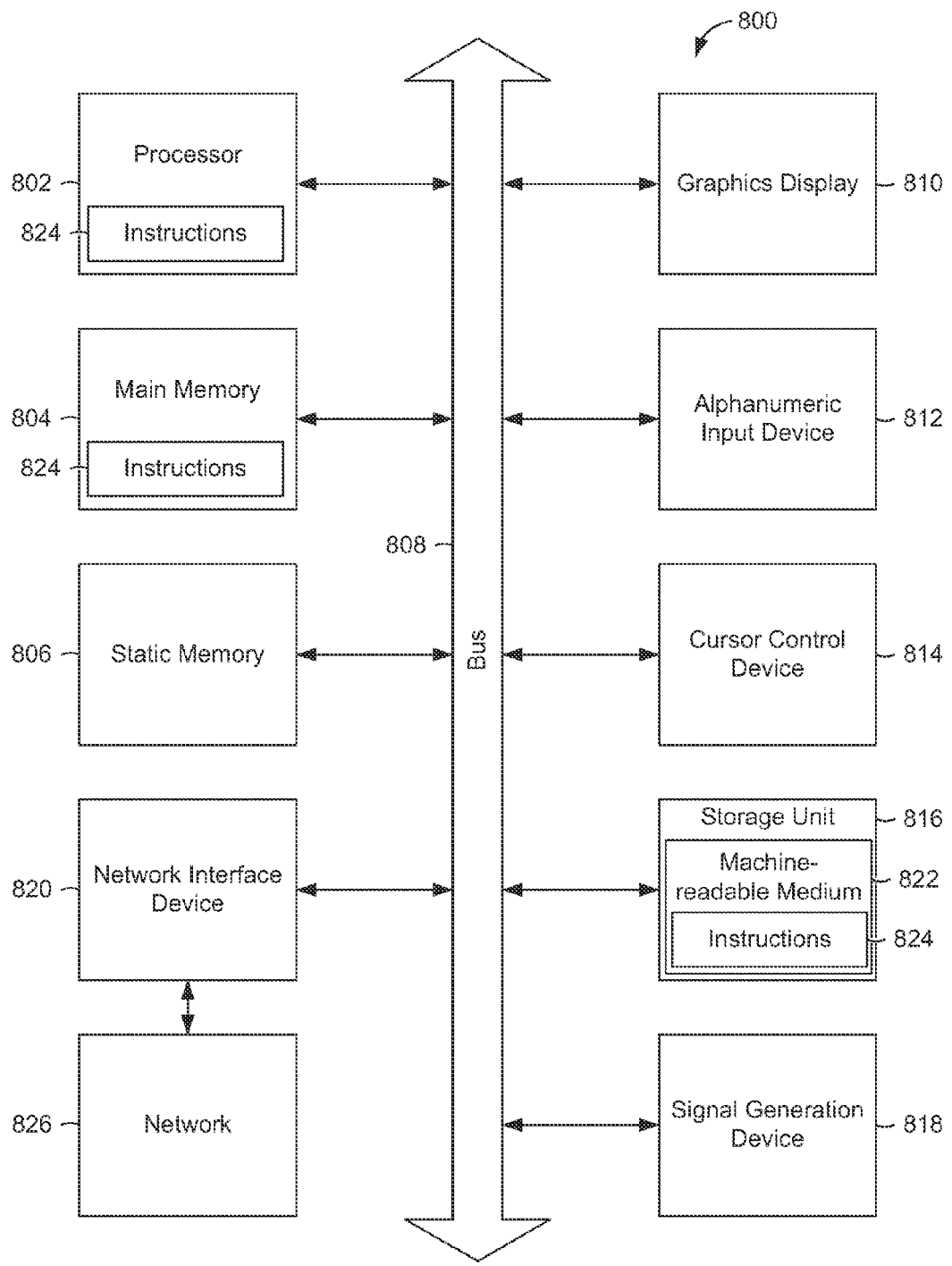
FIG. 8 is a block diagram illustrating components of a machine, according to some example embodiments, able to read instructions from a machine-readable medium and perform any one or more of the methodologies discussed herein.

FIG. 8 is a block diagram illustrating components of a machine 800, according to some example embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system and within which instructions 824 (e.g., software, a program, an application, applet, an app, or other executable code) for causing the machine 800 to perform any one or more of the methodologies discussed herein may be executed. In alternative embodiments, the machine 800 operates as a standalone device or may be connected (e.g., networked) to other machines. In a networked deployment, the machine 800 may operate in the capacity of a server machine or a client machine in a server-client network environment, or as a peer machine in a peer-to-peer (or distributed) network environment. The machine 800 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 824, sequentially or otherwise, that specify actions to be taken by that machine. Further, while only a single machine is illustrated, the term "machine" shall also be taken to include a collection of machines that individually or jointly execute the instructions 824 to perform any one or more of the methodologies discussed herein.

The machine 800 includes a processor 802 (e.g., a central processing unit (CPU), a graphics processing unit (GPU), a digital signal processor (DSP), are application specific integrated circuit (ASIC), a radio-frequency integrated circuit (RFIC), or any suitable combination thereof), a main memory 804, and a static memory 806, which are configured to communicate with each other via a bus 808. The machine 800 may further include a graphics display 810 (e.g., a plasma display panel (PDP), a light emitting diode (LED) display, a liquid crystal display (LCD), a projector, or a cathode ray tube (CRT)). The machine 800 may also include an alphanumeric input device 812 (e.g., a keyboard), a cursor control device 814 (e.g., a mouse, a touchpad, a trackball, a joystick, a motion sensor, or other pointing instrument), a storage unit 816, a signal generation device 818 (e.g., a speaker), and a network interface device 820.

The storage unit 816 includes a machine-readable medium 822 on which is stored the instructions 824 embodying any one or more of the methodologies or functions described herein. The instructions 824 may also reside, completely or at least partially, within the main memory 804, within the processor 802 (e.g., within the processor's cache memory), or both, during execution thereof by the machine 800. Accordingly, the main memory 804 and the processor 802 may be considered as machine-readable media. The instructions 824 may be transmitted or received over a network 826 (e.g., network 190) via the network interface device 820.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 822 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 800), such that the instructions, when executed by one or more processors of the machine (e.g., processor 802), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated descriptions define various example embodiments of methods and systems (e.g., apparatus) discussed herein:

1. A system comprising:
an access module configured to access an identifier that uniquely identifies an entity among multiple entities that are represented within a database;
a processor configured by a generation module to generate an audio piece representative of the entity based on the identifier that uniquely identifies the entity among the multiple entities represented within the database; and
a presentation module configured to present the audio piece that is representative of the entity and that is generated based on the identifier that uniquely identifies the entity among the multiple entities represented within the database.

2. The system of description 1, wherein:
the processor is configured by the generation module to parse the identifier into at least a first digit and compose a melody based on the first digit parsed from the identifier.

3. A method comprising:
accessing an identifier that uniquely identifies an entity among multiple entities that are represented within a database;
generating an audio piece representative of the entity based on the identifier that uniquely identifies the entity among the multiple entities represented within the database, the generating of the audio piece being performed by a processor of a machine; and presenting the audio piece that is representative of the entity and that is generated based on the identifier that uniquely identifies the entity among the multiple entities represented within the database.

4. The method of description 3, wherein:
the accessing of the identifier accesses a user identifier that uniquely identifies a user of a network-based system among multiple users of the network-based system; and
the generating of the audio piece generates an audio avatar of the user.

5. The method of description 4, wherein:
the user identifier is a user number of the user of the network-based system; and
the presenting of the audio piece includes presenting a suggestion that the user share the audio piece with a further user of the network-based system.

6. The method of any of descriptions 3-5, wherein:
the accessing of the identifier accesses an item identifier that uniquely identifies an item that is listed on a network-based system; and
the generating of the audio piece generates an audio representation of the item.

7. The method of description 6, wherein:
the item identifier is a listing number assigned to a listing of the item.

8. The method of any of descriptions 3-7, wherein:
the accessing of the identifier accesses a product identifier that uniquely identifies a product that is advertised by a network-based system; and
the generating of the audio piece generates an audio representation of the product.

9. The method of description 8, wherein:
the product identifier is a stock-keeping unit (SKU) number of the product.

10. The method of any of descriptions 3-9, wherein:
the accessing of the identifier accesses a category identifier that uniquely identifies a category of products that are advertised by a network-based system; and
the generating of the audio piece generates an audio representation of the category of products.

11. The method of any of descriptions 3-10, wherein:
the accessing of the identifier accesses a catalogue identifier that uniquely identifies a catalog that describes multiple categories of products; and
the generating of the audio piece generates an audio representation of the catalog that describes the multiple categories of products.

12. The method of any of descriptions 3-11 further comprising:
receiving an input that references the entity represented by the audio piece generated based on the identifier that uniquely identifies the entity; and wherein
the presenting of the audio piece representative of the entity is responsive to the receiving of the input that references the entity represented by the audio piece.

13. The method of any of descriptions 3-12, wherein:
the generating of the audio piece includes extracting a classification code from the identifier of the entity; and
the generating of the audio piece is based on the classification code extracted from the identifier of the entity.

14. The method of description 13, wherein:
the classification code indicates that the entity is a user with a tenure that transgresses a threshold value; and
the generating of the audio piece is based on the tenure of the user transgressing the threshold value.

15. The method of description 13 or description 14, wherein:
the classification code indicates that the entity is a user that performed a rewardable action; and
the generating of the audio piece incorporates music that corresponds to the rewardable action into the audio piece.

16. The method of any of descriptions 13-15, wherein:
the classification code indicates that the entity corresponds to a geographical region; and
the generating of the audio piece includes selecting a musical instrument voice based on the geographical region of the entity.

17. The method of any of descriptions 13-16, wherein:
the classification code indicates that the entity corresponds to a geographical region; and
the generating of the audio piece includes selecting a musical style based on the geographical region of the entity.

18. The method of any of descriptions 13-17, wherein:
the classification code indicates that the entity is a member of a category that includes some of the multiple entities represented in the database; and
the generating of the audio piece includes selecting a musical style that corresponds to the category of which the entity is the member.

19. The method of any of descriptions 3-18, wherein:
the generating of the audio piece includes accessing a user profile based on the identifier of the entity; and
the generating of the audio piece is based on the user profile.

20. The method of description 19, wherein:
the user profile includes at least one of a seller status of a user, a browse history of the user, a purchase history of the user, or a preferred category of the user.

21. A non-transitory machine-readable storage medium comprising instructions that, when executed by one or more processors of a machine, cause the machine to perform operations comprising:
accessing an identifier that uniquely identifies an entity among multiple entities that are represented within a database;
generating an audio piece representative of the entity based on the identifier that uniquely identifies the entity among the multiple entities represented within the database, the generating of the audio piece being performed by the one or more processors of the machine; and
presenting the audio piece that is representative of the entity and that is generated based on the identifier that uniquely identifies the entity among the multiple entities represented within the database.

22. The non-transitory machine-readable storage medium of description 21, wherein:
the generating of the audio piece includes parsing the identifier into at least a first digit and a second digit and composing music that has a melody based on the first digit parsed from the identifier and has a harmony based on the second digit parsed from the identifier.

What is claimed is:
1. A method, comprising:
causing presentation of a set of musical schemas to a user, the set of musical schemas being representative of a selection of available musical schemas from which to generate an audio avatar;
receiving a selection of a musical schema form the set of musical schema;
accessing a user identifier that uniquely identifies the user among multiple users that are represented within a database;
generating, by at least one processor of a machine, an audio piece representative of the user based on the selected musical schema that uniquely identifies the user among the multiple entities represented within the database, the audio piece having an audio identifier distinct from the user identifier; and causing presentation of the audio piece that is representative of the user and is generated based on the user identifier that uniquely identifies the user among the multiple users represented within the database.

2. The method of claim 1, wherein the set of musical schemas include one or more of a genre of music, a tempo of music, a time signature of music, a key signature of music, a rhythm of music, and a scale of music.

3. The method of claim 1, wherein generating the audio piece further comprises:
generating the audio piece based on the selected musical schema.

4. The method of claim 1, wherein the user identifier includes a classification code, and generating the audio piece further comprises:
generating the audio piece based on the selected musical schema and the classification code.

5. The method of claim 1, wherein causing presentation of the audio piece further comprises:
communicating at least a portion of the audio piece to a user device associated with the user and causing presentation of the audio piece on the user device.

6. The method of claim 1 further comprising:
based on generation of the audio piece representative of the user, storing the audio piece for subsequent access and presentation.

7. A system, comprising:
a presentation module configured to cause presentation of a set of musical schemas to a user, the set of musical schemas being representative of a selection of available musical schemas from which to generate an audio avatar and to cause presentation of an audio piece that is representative of the user and is generated based on a user identifier that uniquely identifies the user among multiple users represented within a database;

an access module configured to receive a selection of a musical schema from the set of musical schema and to access a user identifier that uniquely identities the user among multiple users that are represented within the database; and a processor configured by a generation module to generate the audio piece representative of the user based on the user identifier that uniquely identifies the user among the multiple users represented within the database, the audio piece having an audio identifier distinct from the user identifier.

8. The system of claim 7, wherein generating the audio piece further comprises:
the generation module configured to generate the audio piece based on the selected musical schema.

9. The system of claim 7, wherein causing presentation of the audio piece further comprises:
the presentation module configured to communicate at least a portion of the audio piece to a user device associated with the user and cause presentation of the audio piece on the user device.

10. The system of claim 7, wherein the presentation module is configured to store the audio piece for subsequent access and presentation based on generation of the audio piece representative of the user.

11. A non-transitory machine-readable storage medium comprising instructions that, when executed by one or more processors of a machine, cause the machine to perform operations comprising:

causing presentation of a set of musical schemas to a user, the set of musical schemas being representative of a selection of available musical schemas from which to generate an audio avatar;

receiving a selection of a musical schema form the set of musical schema;

accessing a user identifier that uniquely identifies the user among multiple users that are represented within a database;

generating, by at least one processor of a machine, an audio piece representative of the user based on the selected musical schema that uniquely identifies the user among the multiple entities represented within the database, the audio piece having an audio identifier distinct from the user identifier; and causing presentation of the audio piece that is representative of the user and is generated based on the user identifier that uniquely identifies the user among the multiple users represented within the database.

12. The non-transitory machine-readable storage medium of claim 11, wherein operations for generating the audio piece further comprise:
generating the audio piece based on the selected musical schema.

13. The non-transitory machine-readable storage medium of claim 11, wherein the user identifier includes a classification code, and operations for generating the audio piece further comprise:
generating the audio piece based on the selected musical schema and the classification code.

14. The non-transitory machine-readable storage medium of claim 11, wherein the operations for causing presentation of the audio piece further comprise:
communicating at least a portion of the audio piece to a user device associated with the user and causing presentation of the audio piece on the user device.

15. A method comprising:
accessing an entity identifier that identifies an entity among multiple entities that are represented within a database, the entity identifier including a classification code;

extracting the classification code from the entity identifier;

generating, by at least one processor of a machine, an audio piece that represents the entity based on the entity identifier that identifies the entity among the multiple entities represented within the database, the generating of the audio piece including determining a musical schema based on the classification code extracted from the entity identifier, the audio piece having an audio identifier distinct from the entity identifier; and causing presentation of the audio piece that is representative of the entity and is generated based on the entity identifier that identifies the entity among the multiple entities represented within the database.

16. The method of claim 15, wherein extracting the classification code from the entity identifier further comprises:
parsing the entity identifier into a set of digits; and
hashing the entity identifier.

17. A system, comprising:
an access module configured to access an entity identifier that identifies an entity among multiple entities that are represented within a database, the entity identifier including a classification code;

a processor configured by a generation module to extract the classification code from the entity identifier and to generate an audio piece representative of the entity based on the entity identifier that identifies the entity among the multiple entities represented within the database, the generating of the audio piece including determining a musical schema based on the classification code extracted from the entity identifier, the audio piece having an audio identifier distinct from the entity identifier; and a presentation module configured to cause presentation of the audio piece that is representative of the entity and is generated based on the entity identifier that identifies the entity among the multiple entities represented within the database.

18. The system of claim 17, wherein extracting the classification code from the entity identifier further comprises parsing the entity identifier into a set of digits and hashing the entity identifier.

19. A non-transitory machine-readable storage medium comprising instructions that, when executed by one or more processors of a machine, cause the machine to perform operations comprising:

accessing an entity identifier that identifies an entity among multiple entities that are represented within a database, the entity identifier including a classification code;

extracting the classification code from the entity identifier;

generating, by at least one processor of a machine, an audio piece representative of the entity based on the entity identifier that identifies the entity among the multiple entities represented within the database, the generating of the audio piece including determining a musical schema based on the classification code extracted from the entity identifier, the audio piece having an audio identifier distinct from the entity identifier; and causing presentation of the audio piece that is representative of the entity and is generated based on the entity identifier that identifies the entity among the multiple entities represented within the database.

20. The non-transitory machine-readable storage medium of claim 19, wherein extracting the classification code from the entity identifier causes the machine to perform operations comprising:

parsing the entity identifier into a set of digits; and hashing the entity identifier.

* * * * *

UNITED STATES PATENT AND TRADEMARK OFFICE
CERTIFICATE OF CORRECTION

PATENT NO. : 9,442,691 B2
APPLICATION NO. : 14/595125
DATED : September 13, 2016
INVENTOR(S) : Huaping Gu Page 1 of 1

It is certified that error appears in the above-identified patent and that said Letters Patent is hereby corrected as shown below:

In the Claims

In Column 19, Line 41, in Claim 7, delete "identities" and insert --identifies--, therefor Signed and Sealed this
Thirteenth Day of March, 2018

Andrei Iancu
*Director of the United States Patent and Trademark Office*